United States Patent
Mei

(10) Patent No.: US 11,355,023 B2
(45) Date of Patent: Jun. 7, 2022

(54) SYSTEM AND METHOD FOR INTERVENTION WITH ATTENTION DEFICIENT DISORDERS

(71) Applicant: Kennesaw State University Research and Service Foundation, Inc., Kennesaw, GA (US)

(72) Inventor: Chao Mei, Marietta, GA (US)

(73) Assignee: Kennesaw State University Research And Service Foundation, Inc., Kennesaw, GA (US)

( * ) Notice: Subject to any disclaimer, the term of this patent is extended or adjusted under 35 U.S.C. 154(b) by 748 days.

(21) Appl. No.: 16/047,224

(22) Filed: Jul. 27, 2018

(65) Prior Publication Data

US 2019/0035293 A1   Jan. 31, 2019

Related U.S. Application Data

(60) Provisional application No. 62/537,854, filed on Jul. 27, 2017.

(51) Int. Cl.
  *G09B 5/02* (2006.01)
  *G06F 3/01* (2006.01)
  *G09B 5/00* (2006.01)

(52) U.S. Cl.
  CPC .............. *G09B 5/02* (2013.01); *G06F 3/013* (2013.01); *G06F 3/011* (2013.01); *G09B 5/00* (2013.01)

(58) Field of Classification Search
  None
  See application file for complete search history.

(56) References Cited

U.S. PATENT DOCUMENTS

| | | | |
|---|---|---|---|
| 2008/0110115 A1* | 5/2008 | French | A63B 71/04 52/311.1 |
| 2014/0198297 A1* | 7/2014 | Bathiche | A61B 3/08 351/203 |

(Continued)

OTHER PUBLICATIONS

EEG Hacker; "Detecting Concentration"; Apr. 22, 2014; 6pgs.; retrieved from http://eeghacker.blogspot.com/2014/04/detecting-concentration.html on Jul. 25, 2018.*

(Continued)

*Primary Examiner* — James B Hull
(74) *Attorney, Agent, or Firm* — Smith, Gambrell & Russell LLP

(57) ABSTRACT

A system for treatment and/or psychology intervention of attention deficit disorders in a user in need thereof. The system uses a head mounted display equipped with an eye tracking device. The system is configured to display a scene that includes a principal object and at least one secondary object, then use the eye tracking device to determine whether the user's gaze is directed to one of the objects. If the user's gaze is directed to one of the secondary objects beyond a threshold criterion, that secondary object is removed from the scene. If the user's gaze is directed to the principal object beyond a threshold criterion, a previously removed secondary object is reintroduced into the scene. The principal object is a desired object of the user's attention, while the secondary object(s) may be potentially or known distracting objects. Corresponding software and methods are also disclosed.

9 Claims, 9 Drawing Sheets

(56) References Cited

U.S. PATENT DOCUMENTS

| | | | | |
|---|---|---|---|---|
| 2015/0338915 | A1* | 11/2015 | Publicover | G02B 27/017 |
| | | | | 345/633 |
| 2016/0341980 | A1* | 11/2016 | Farris | A61F 9/022 |
| 2017/0246070 | A1* | 8/2017 | Osterhout | H04N 5/23296 |
| 2017/0295229 | A1* | 10/2017 | Shams | G09B 21/008 |
| 2017/0358256 | A1* | 12/2017 | Ross | G09G 3/3611 |
| 2020/0057487 | A1* | 2/2020 | Sicconi | G06T 7/174 |
| 2020/0121237 | A1* | 4/2020 | Yellin | A61B 3/113 |

OTHER PUBLICATIONS

Villarejo et al., A Stress Sensor Based on Galvanic Skin Response (GSR) Controlled by ZigBee, Sensors (Basel), 2012, 12(5):6075-6101, https://www.ncbi.nlm.nih.gov/pmc/articles/PMC3386730/, publ. online May 10, 2012.

A. Papoutsaki, et al.; "WebGazer: Scalable Webcam Eye Tracking Using User Interactions"; Proceedings of the Twenty-Fifth International Joint Conference on Artificial Intelligence (IJCAI-16); 2016; pp. 3839-3845.

* cited by examiner

SYSTEM AND METHOD FOR INTERVENTION WITH ATTENTION DEFICIENT DISORDERS

CROSS-REFERENCE TO RELATED APPLICATIONS

This application is a continuation of U.S. Patent Application No. 62/537,854, filed Jul. 27, 2017, which is incorporated by reference in its entirety.

BACKGROUND

Virtual reality and augmented reality platforms have been used for various purposes, including education. However, there remains a need for addressing customized learning and treatment of conditions such as those affecting attention or focus.

SUMMARY

A system and method for the treatment/psychology intervention of the attention deficit disorders including but not limited to autism spectrum disorders in a user (e.g., patient, student, player, participant) in need of such treatment. The system uses a head mounted display equipped with an eye tracking device. The system is configured to display a scene using the head mounted display that includes a primary or principal object, such as a virtual teacher, and at least one secondary object, such as virtual representations of other objects commonly found in a classroom environment.

The system is configured to use the eye tracking device to determine whether the patient's gaze is directed to the principal object or one of the secondary objects. If the patient's gaze is directed to one of the secondary objects beyond a threshold period or proportion of time, that secondary object is removed from the scene to reduce the complexity of the displayed scene. Various thresholds may be used such as 5 sec to 120 sec and intervening endpoints within the range. Thresholds above 120 sec may be used. Thresholds may be customized for particular users and may be based on heuristics or historical data, learned behavior, or user profiles. Thresholds may comprise a proportion of time on a given object compared to other objects or a length of time of a lesson or session. This step is repeated and the object that has been removed are queued, which is a benefit of the system because removing an arbitrary object in a non-simulated situation may be impossible. If the patient's gaze is directed to the principal object beyond a threshold period or proportion of time, a previously removed secondary object is reintroduced into the scene to increase the complexity of displayed scene. The queued objects are reintroduced into the scene one by one. This one-by-one reintroduction, combined with prolonged exposure, is another benefit of the system, because such iteration in a non-simulated situation may be impossible. The inventive system, however, both includes it and renders it automatic. Monitoring the patient's gaze, as a proxy for attention, and manipulation of the complexity of the displayed scene, as a proxy for environments including potential distractions, provides a form of joint attention training and prolonged exposure therapy to patients who have difficulty maintaining sustained attention in real world settings. The corresponding method, using a display such as a head mounted display, flat screen display, or projection screen, in combination with an eye tracking device, comprises the steps of displaying a scene including such objects, determining whether the patient's gaze is directed to one of the secondary objects beyond some threshold criterion, and removing and reintroducing secondary objects to the displayed scene as described above.

Additional advantages will be set forth in part in the description which follows or may be learned by practice. It is to be understood that both the foregoing general description and the following detailed description are exemplary and explanatory only and are not restrictive.

DETAILED DESCRIPTION OF ILLUSTRATIVE EMBODIMENTS

Current treatments and intervention therapies conducted in autism spectrum disorder (ASD) clinics include therapies such as Parent Education and Training (PET), Social Skills Training (SST) and Speech-Language Therapy (SLT), Cognitive Behavioral Therapy (CBT), Applied Behavioral Analysis (ABA), and Sensory Integration/Occupational Therapy (OT-SI). Each of these therapeutic approaches require that a therapist, parent, or caregiver conduct specialized and detailed interactions with the patient. While not a substitute for such therapies, it is desirable to develop and offer additional therapy options that do not require such focused, one-on-one or many-on-one patient interaction, supplementing existing therapies and providing further opportunities for skill development and refinement.

The disclosed system and method provide a form of joint attention training to patients with autism spectrum disorder, attention deficit disorder, and other similar cognitive disorders that impair a patient's ability to focus his or her attention on a primary or "principal object" of attention, such as a teacher or other presenter, an instructional video or textbook, an experiment or student project, etc. The system and method may also be used to provide a form of prolonged exposure therapy for objects, whether commonly or not commonly found in a particular environment, known to be a source of excessive distraction to such a patient.

In contrast to many current therapies, the inventive system and method can be used outside the presence of a therapist of therapist-trained individual, providing a less resource-intensive and expensive way to supplement or extend a plan of therapy. Screen-based or so-called "immersive" Virtual Reality (VR) technologies are employed to create an automated and adaptive therapy for patients seeking to improve their attention or focus, as well as their ability to disregard distractions with their environment.

Figure 1:
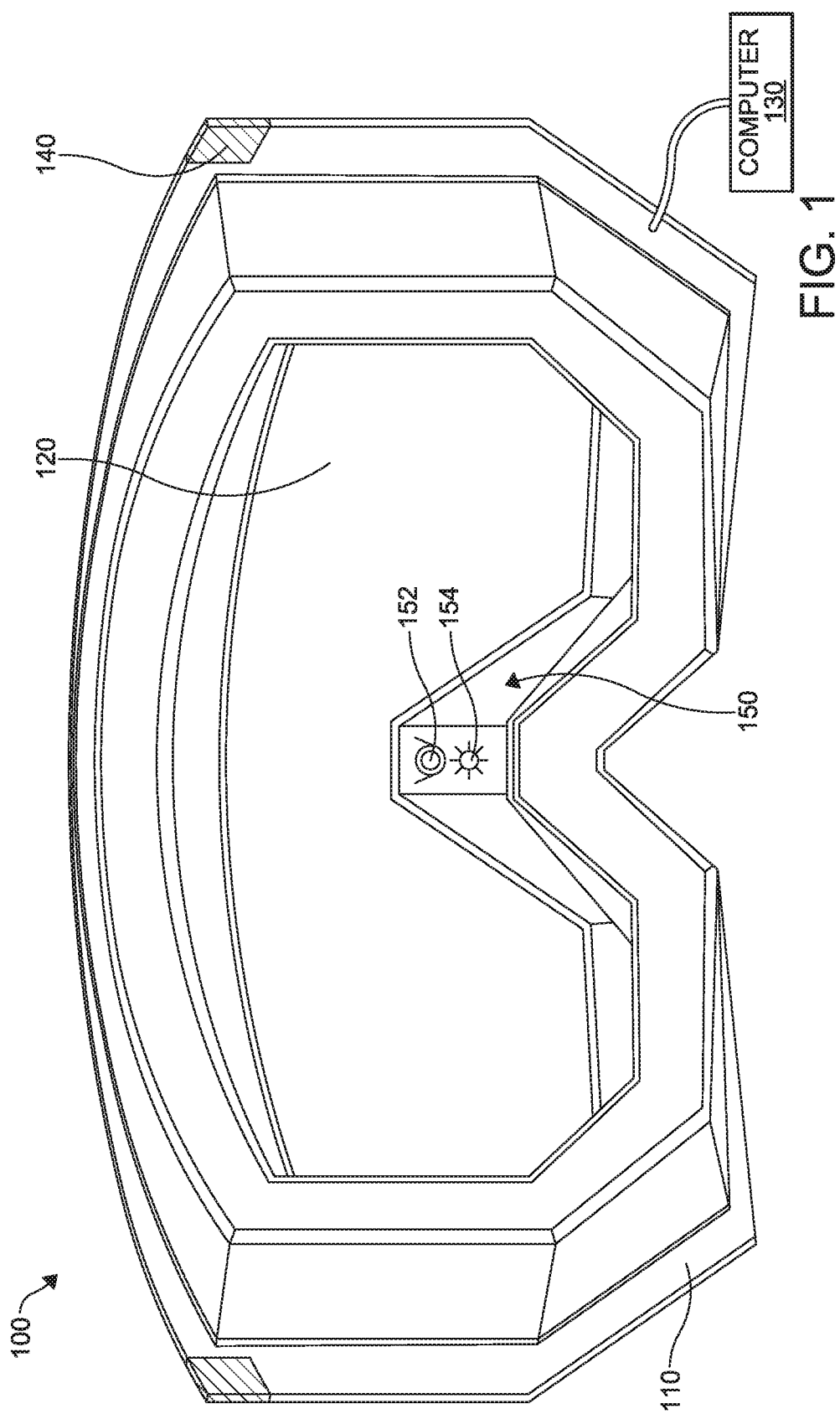
FIG. 1 is a schematic diagram of a head mounted display equipped with an integral eye tracking device.

FIG. 1 shows a hardware to implement the inventive treatment/intervention system. It includes a head mounted display (HMD) 100 equipped with an eye tracking device 150. The head mounted display 100 conventionally includes a goggle-like frame 110 holding a display 120 that simulates or actually provides binocular vision. The display 120 is usually operably connected to a stand-alone computer 130 by a wired or wireless link, but HIVID-integratable computers 130 such as cellular phone devices mountable within Samsung Electronics Co.'s Gear VR system, as well as HIVID-integrated computers such as those used in specialized VR-only systems are known. The head mounted display 100 may include a position and orientation tracking system 140, such as an accelerometer array, a photodiode array that receives light broadcast from an external reference source, or magnetic or ultrasound sensors that detect signals broadcast from external reference sources, but it will be appreciated that the head tracking provided by such systems is not a critical element of the disclosed system. The eye tracking device 150 conventionally includes at least one camera 152 positioned to image the surface of an eye and software or firmware which derives a gaze direction from the position of structures and/or corneal reflections from an eye. The eye tracking device 150 may include a light source 154 such as an infrared LED to illuminate the eye, but it will be appreciated that the display 120 may be used as an incidental light source with tracking by visible light.

Figure 2:
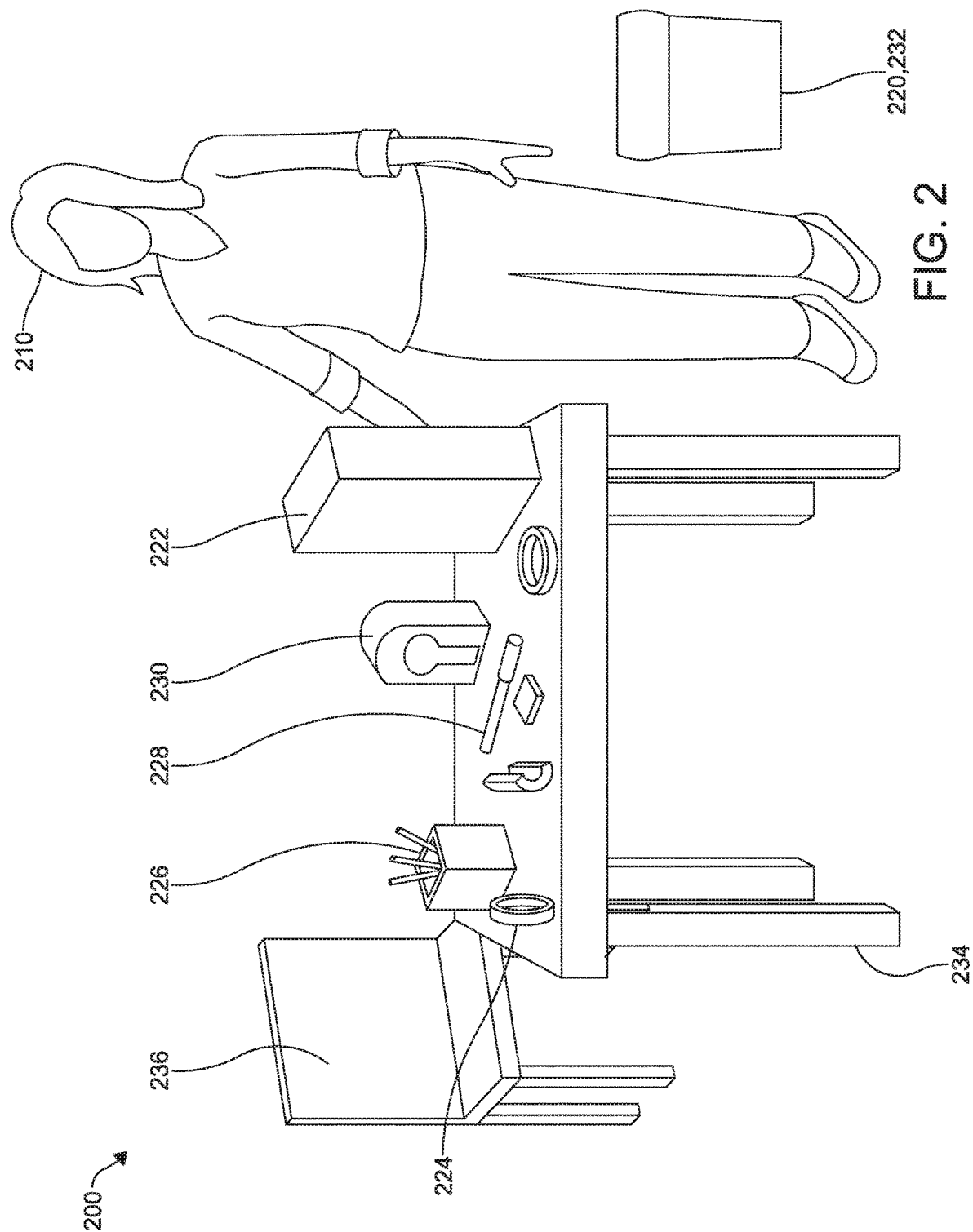
FIG. 2 shows an exemplary scene for display using the head mounted display.

The head mounted display 100 is configured, e.g., programmed and controlled by software executed by computer 130, to display an exemplary scene 200 and noting the content of such scene is replaceable as one skilled in the art will appreciate, by the head mounted display that includes a primary or principal object 210, such as a virtual teacher or presenter. FIG. 2 is an example of such a scene 200. The exemplary teacher may be shown presenting a lesson, and preferably the lesson is one of any of several lessons created for patients of various ages, with the particular lesson being selected based on the patient's age and/or capabilities, so as to be appropriately engaging for others of similar ages or capabilities. As previously disclosed, the principal object 210 may instead be an instructional video or a textbook. If the patient is provided with suitable hand-based VR controllers, the principal object 210 could instead be an interactive experiment or student project. The patient will observe the scene by the head mounted display 100 and, if provided with controllers, potentially interact with the principal object 210.

The scene 200 also includes at least one secondary object 220. Such secondary objects 220 preferably represent objects that would be commonly found in an environment represented by displayed scene. For example, where the principal object 210 is a teacher and the scene is a classroom, the secondary objects 220 may include a book 222, a roll of tape 224, a pen and pencil holder 226, a pen 228, a pencil sharpener 230, a wastebasket 232, a desk 234, and a chair 236. Secondary object could also or alternately include any stationary object or object with motions that may distract the user from the principle object.

The head mounted display 100 is further configured, e.g., programmed and controlled by software executed by the computer 130, to use the eye tracking device to determine whether the patient's gaze is directed to the principal object 210 or to one of the secondary objects 220. The camera 152 of the eye tracking device 150 images the eye to determine gaze direction from at least one of the imaged position of the pupil, a so-called Purkinje image that are images reflected from the surfaces of the cornea, P1 and P2 images, and surfaces of the lens, P3 and P4 images, and an image of the anterior of the eye. The gaze direction is then correlated with a location on a screen, such as of the display 120, by the software executed by the computer 130. An exemplary eye tracking system is described in Webgazer: scalable webcam eye tracking using user interactions, IJCAP16 Proceedings of the Twenty-Fifth International Joint Conference on Artificial Intelligence, pp. 3839-3845 and at webgazer.cs.brown.edu.

The head mounted display 100 is combined with software for execution by the computer 130 which carries out the steps of the method and steps described below. The software may be provided by a network and/or non-transient computer-readable storage medium bearing recorded instructions for the execution of the method and steps described below. Examples of such non-transient computer-readable storage media include a read only memory (ROM), an erasable programmable read-only memory (EPROM), a flash memory (so-called flash card, SD card, USB stick, and the like), an optical disc (compact disk, digital versatile disk, blu-ray disk, and the like), a hard drive, and so-called "solid state drives" (e.g., NAND flash-based mass storage devices).

In embodiments, the system may preferably use a head mounted display because it beneficially blocks contact with the present environment; there may be distracting objects that are out of the control of the computer generated virtual world. In embodiments, the system may use a non-head mounted display, e.g., a television or computer monitor, a projection screen, etc., and an eye tracking device, e.g., a so-called webcam, a head-mounted eye tracking device, or a display-integrated eye tracking device such as screen-based or laptop-integrated eye tracking devices manufactured by Tobii AB (Stockholm, Sweden). These elements may be dual-purpose or multi-purpose devices, so that systems intended for use with such third party devices may be configurable for operation with, but will not necessarily include, elements other than the software element. Consequently, one embodiment is a network or a nontransient computer-readable medium bearing recoded instructions for execution of the method and steps described below.

Figure 6:
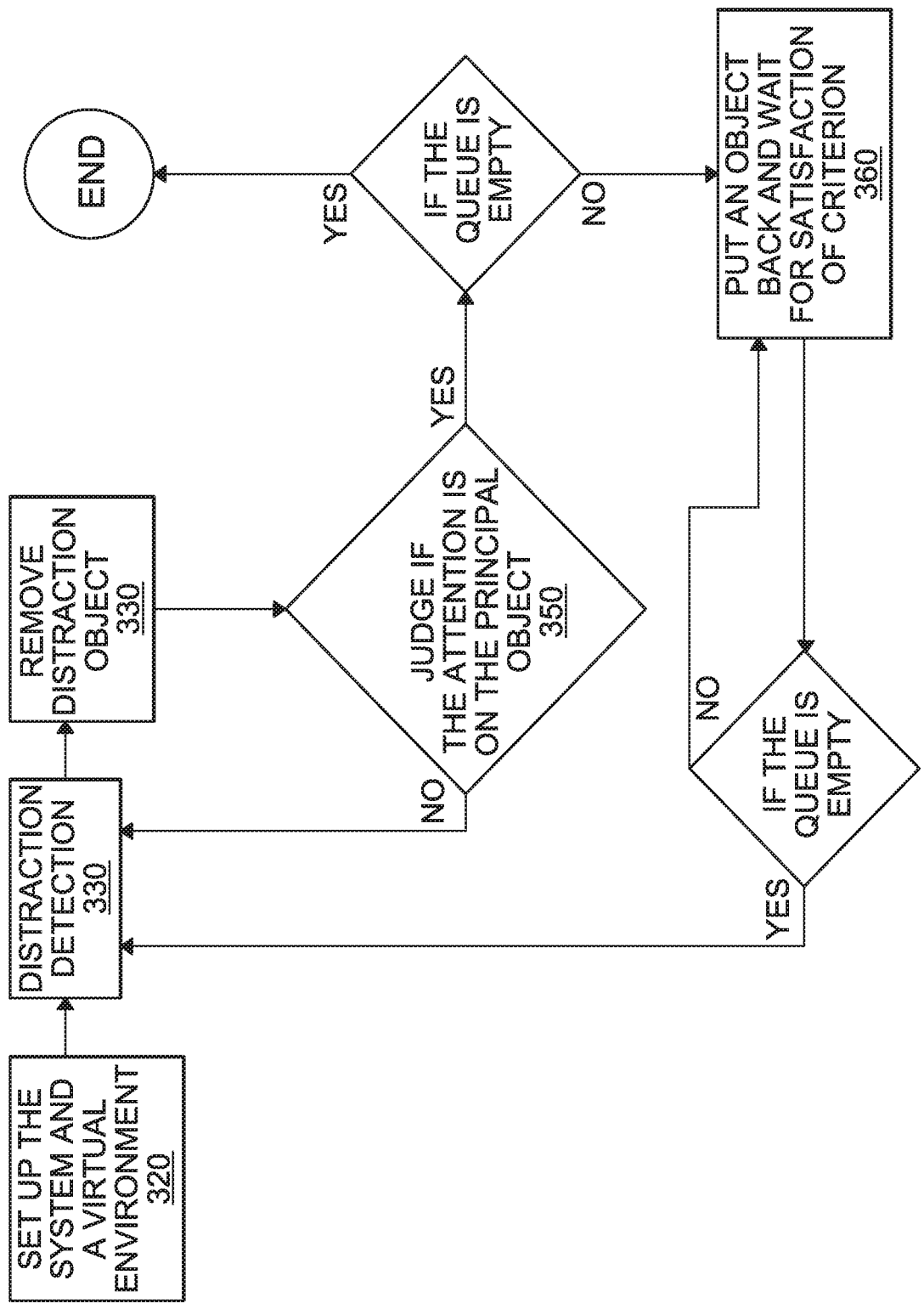
FIG. 6 is a flow chart showing an exemplary method for displaying a scene.

The method 300 for performance by a system, summarized in FIG. 6, includes a step 310 of displaying a scene 200 that includes the principal object 210 and at least one secondary object 220. The principal object 210 is the therapeutically desired object of the patient's gaze, which serves as a proxy for the therapeutically desired focus of attention. The secondary object or objects 220 are therapeutically undesired objects of the patient's gaze, and serve as proxies for potential or known distraction objects commonly found within the environment depicted by the scene 200 or, optionally, for objects known to be distracting to the patient in that or other environments.

In step 320, upon display of the principal and secondary objects, the system tracks the direction of the patient's gaze and correlates the tracked direction with the displayed objects. The patent's gaze may correlate with the principal object 210, a secondary object 220, or potentially none of the displayed objects.

In step 330, based on the tracked direction and correlation, the system determines whether the patient's gaze has a correlation with a secondary object 220 above a threshold distraction criterion. The threshold distraction criterion may be a period of time that differs from person to person, e.g., a threshold of 5 seconds, to avoid triggering in response to ordinary lapses in attention. The threshold criterion may instead, e.g., be a proportion of time after an initial delay period and determined by user studies and dependent upon content, e.g., a threshold of some percent of elapsed time after an initial delay period of some number of seconds, to permit the patient to initially examine the scene and become engaged with the principal object 210. As another option, if the user is monitored by a second person as an observer, the user's language can be used to detect the distraction (e.g. The exclamation "Wow, I like this red pen!" may clearly indicate the distraction of a red pen in the scene). The second person can then input the distraction into the computer 130. In one embodiment, distraction criterion may also combine the eye gazing data (e.g. the object that is currently being gazed) and other physiology data (e.g. heart rate, electroencephalogram (EEG) signal, galvanic skin response (GSR) signal, etc.) to increase accuracy, as known in the art.

Figure 3:
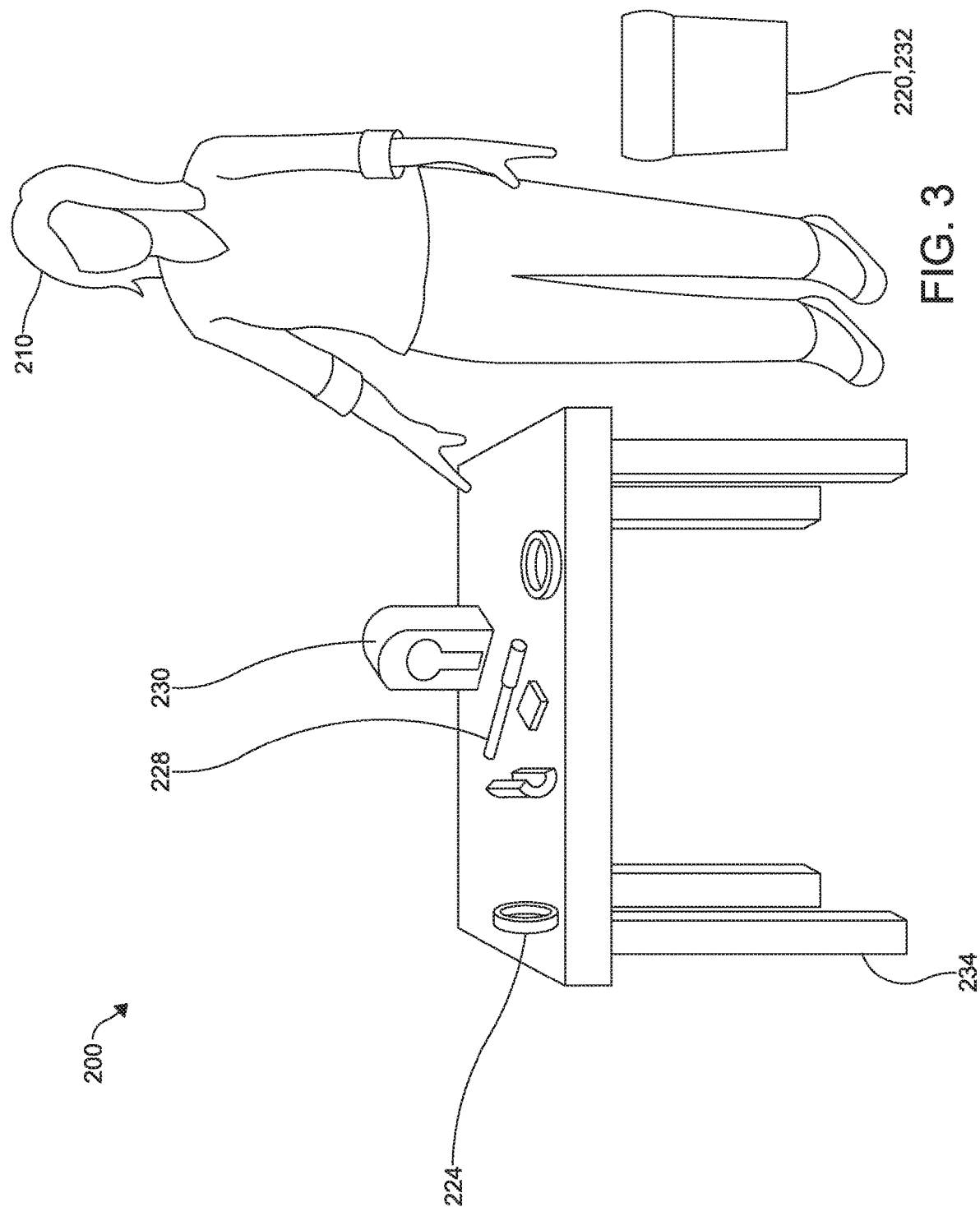
FIG. 3 shows the exemplary scene of FIG. 2 after several secondary objects have been removed.

In step 340, when a threshold distraction criterion is exceeded, the system removes the correlated secondary object from the displayed scene. For example, as FIG. 3 shows, a patient may be distracted by secondary objects 220 such as the book 222, the pen and pencil holder 226, and the chair 236 (each omitted vs. FIG. 2). Removing a distracting secondary object from the scene reduces scene complexity as well as sources of distraction, which should assist the patient in returning his or her gaze and attention to the primary object 210, as illustrated, the teacher, and avoiding distraction by other secondary objects.

In step 350, based on the tracked direction and correlation, the system determines whether the patient's gaze has a correlation with the primary object 210 above a threshold attention criterion. The threshold criterion may be, e.g., a proportion of time after an initial delay period, e.g., a threshold determined of studies, e.g., 90% of elapsed time after an initial delay period of some number of seconds, again to permit the patient to initially examine the scene and become engaged with the principal object 210, as well as to accommodate ordinary lapses in attention. The threshold attention criterion may instead, e.g., be a period of time, e.g., a threshold of some number of seconds, after exceeding a threshold distraction criterion or a proportion of time after an exceedance of a threshold distraction criterion and post-exceedance delay period, e.g., a threshold of some percent of elapsed time after a post-exceedance delay period of some number of seconds. In one embodiment, if the user is monitored by a second person as an observer, the user's language can be used to detect the distraction, as previously described. The distraction criterion could also combine the eye gazing and other physiology data as previously described. The threshold attention criterion is intended to increase scene complexity and sources of distraction only after a patient has exhibited sufficient attention to the therapeutically desired object of the patient's gaze, in contrast to mere inattention, i.e., attention to none of the displayed objects. It will be appreciated that, in one embodiment, step 350 may be replaced with a simple postexceedance delay period criterion. If the threshold of the desired object cannot be met, e.g., because a new distracting object appears, steps 330, 340 will be repeated and the new distracting object will be removed and put in the queue.

Figure 4:
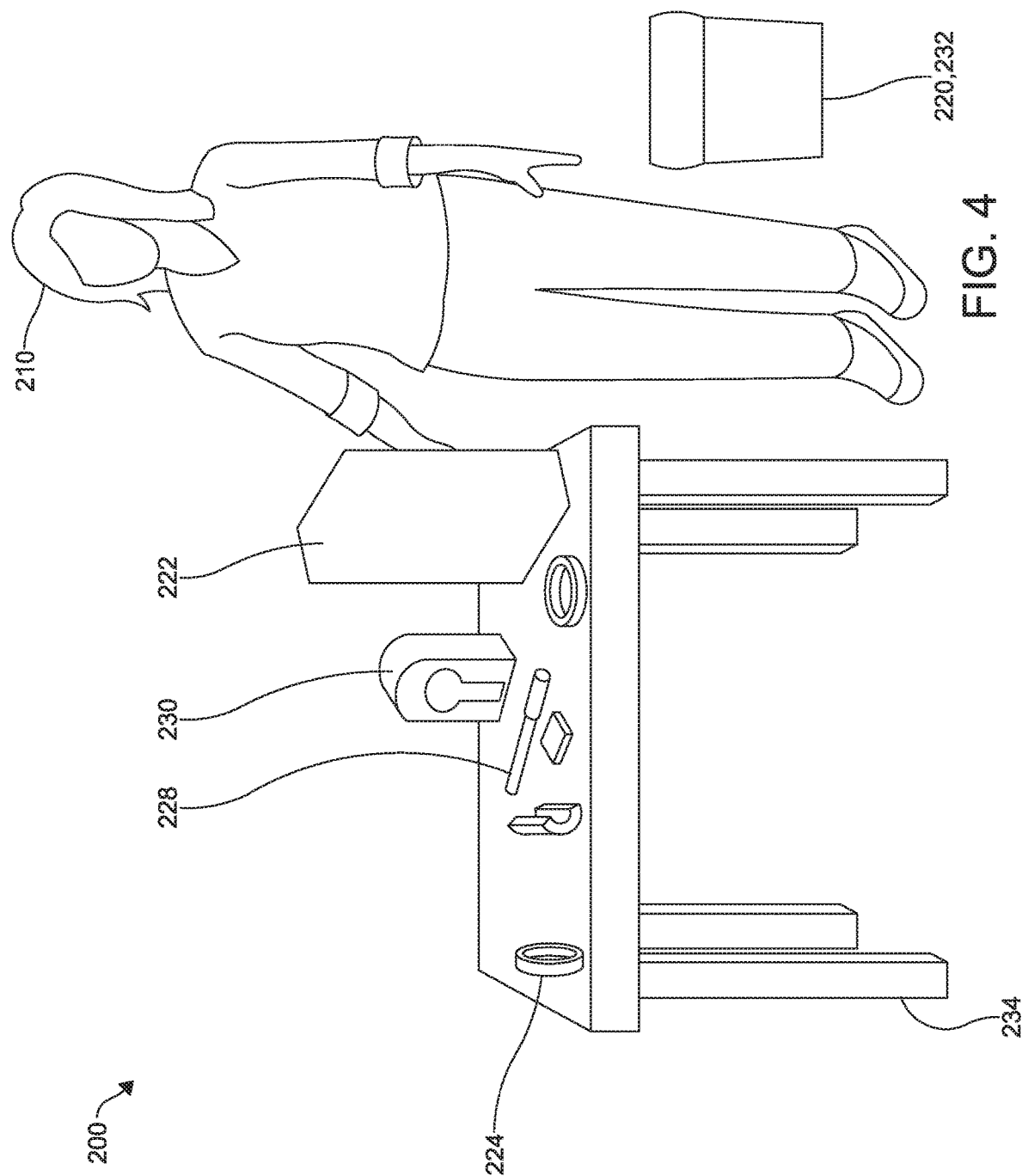
FIG. 4 shows the exemplary scene of FIG. 3 as one of the previously removed secondary objects is reintroduced.
Figure 5:
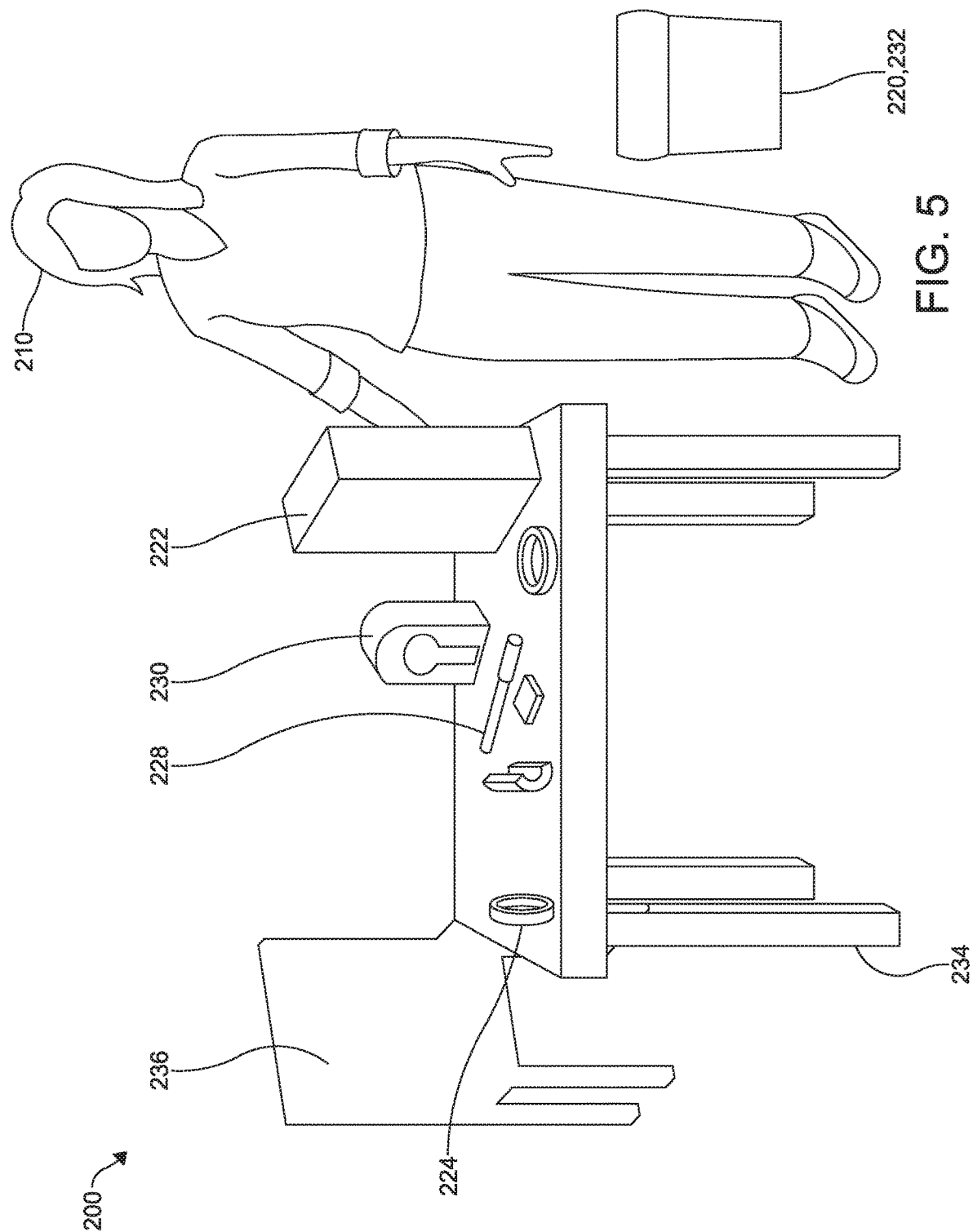
FIG. 5 shows the exemplary scene of FIG. 4 as another one of the previously removed secondary objects is reintroduced.

In step 360, upon exceedance of the threshold attention criterion, the system reintroduces a previously removed secondary object 220 (if any). Preferably, only one previously removed secondary object is reintroduced upon exceedance of the threshold attention criterion, so that removed secondary objects are in effect queued for reintroduction, e.g., first-in-first-out or last-in-first-out) and reintroduction of a secondary object "resets the clock" for the threshold attention criterion. It will be appreciated that in the aforementioned embodiments, expiration of the post-exceedance delay period would replace exceedance of the threshold attention criterion as the trigger for reintroduction. For example, as FIG. 4 shows, a patient previously distracted by secondary objects 220 such as the book 222, the pen and pencil holder 226, and the chair 236 (each omitted versus FIG. 2) may have the book 222 reintroduced to the scene (versus FIG. 3; highlighted for emphasis). Further satisfaction of the threshold attention criterion, or lapse of the post-exceedance delay period would, as FIG. 5 shows, have the chair 236 reintroduced to the scene (versus FIG. 4, highlighted for emphasis).

The steps 320-360 may be repeated during a therapeutic period, such as a twenty to forty minute period meant to simulate a typical classroom or therapy period. It will be appreciated that steps 340 and 360 may not actually be performed if the patient sustains attention on the principal object 210, but that the system is configured or programmed to and the software or method is capable of performing the functions in the event that a criterion is satisfied.

Figure 7:
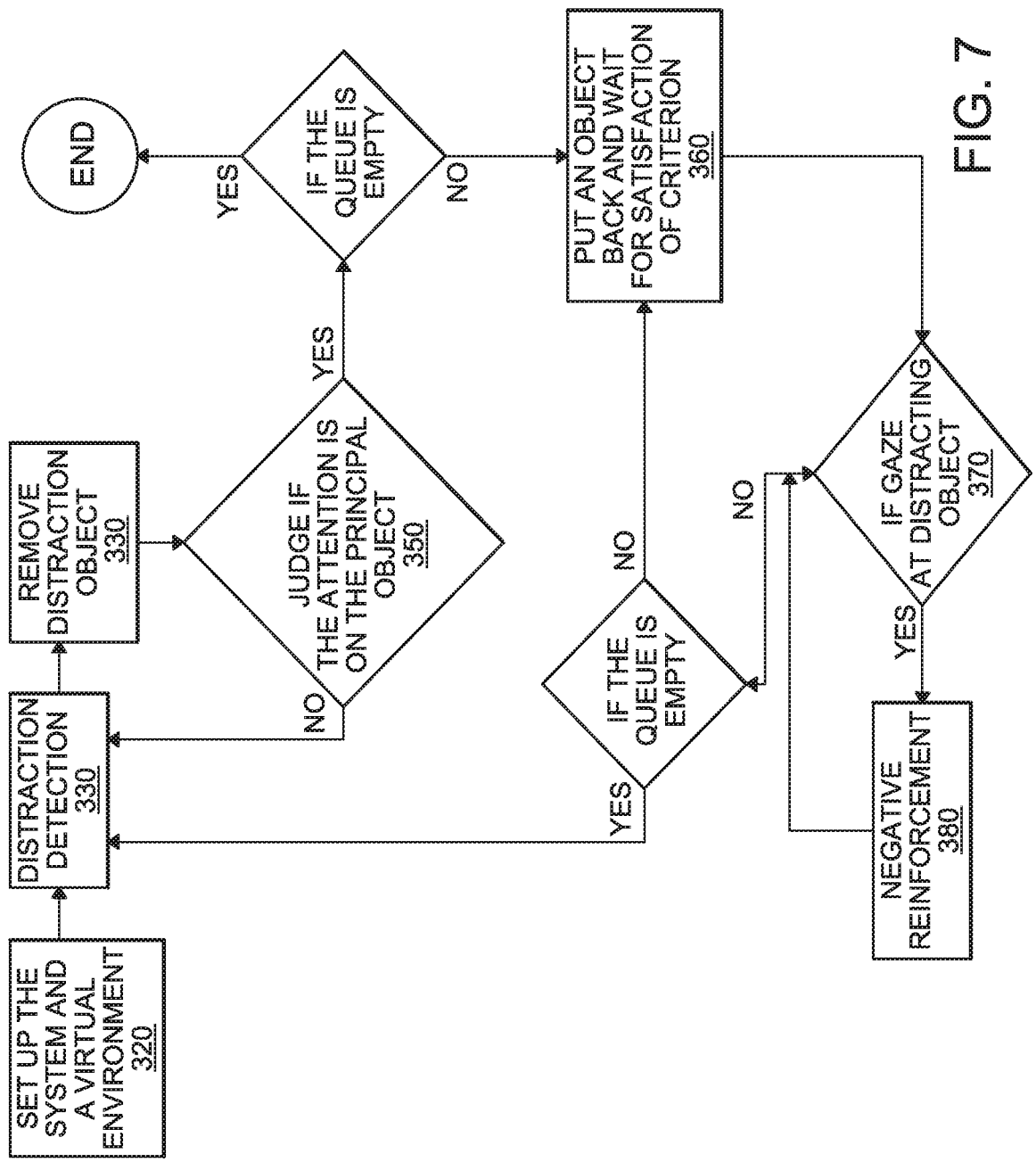
FIG. 7 is a flow chart showing another method for displaying a scene.

In an optional step 370, shown in FIG. 7, based upon the tracked direction and correlation, the method may include determining whether the patient's gaze has a correlation with a reintroduced secondary object 220 above the same or potentially a different threshold distraction criterion. In a related step 380, on exceedance of that threshold distraction criterion, the method alters the display of the reintroduced secondary object 220 for negative reinforcement purposes. For example, the secondary object may be caused to blink, be blurred, become a source of glare, be superimposed with a contrasting pattern or simulated static, or the like. FIG. 5 may be considered to show an example of a "glare" alteration of the secondary object 236 for negative reinforcement.

Figure 8A:
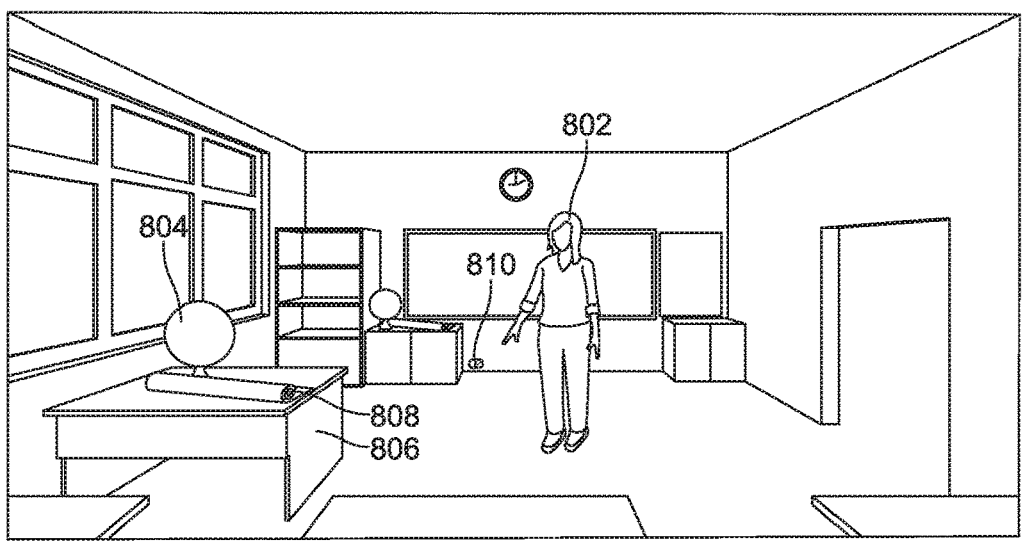
FIG. 8A is a diagram showing another exemplary scene.

FIG. 8A is a diagram showing another exemplary scene. The scene may be displayed to a user. For example, the scene may be displayed via the display 120 of the head mounted display. The scene may comprise a computer generated virtual scene. The computer 130 may generate the scene.

The scene may show a teacher in a classroom. The scene may be from the perspective of a user sitting at a desk in the classroom. The classroom may comprise one or more objects, such as people, walls, windows, furniture, and/or the like. The one or more objects may be associated with a teaching scenario. The one or more objects may comprise a teacher, a desk, a globe, a map, and/or the like. The one or more objects may have an associated status, such as a primary object 802, and one or more secondary objects 804, 806, and 808. In this example scenario, the teacher may be the primary object 802. The globe 804, desk 806, map 808, and/or the like may be secondary objects. The computer 130 may be configured to train a user to gaze at the primary object 802 instead of the one or more secondary objects 804, 806, and 808 (e.g., as part of therapy described herein).

A gaze 810 of the user may be tracked. The gaze 810 of the user is shown in FIG. 8A near the center of the room (e.g., or on the back wall). The gaze 810 is represented as two partially overlapping elliptical shapes, with the left shape representing a left eye of the user and the right shape representing the right eye of the user. Though the gaze 810 is shown here for purposes of explanation, it should be understood that the gaze 810 may not be displayed to the user. The gaze 810 may be stored as a coordinate (e.g., or range of coordinates), a direction, and/or a path in the scene (e.g., room).

Figure 8B:
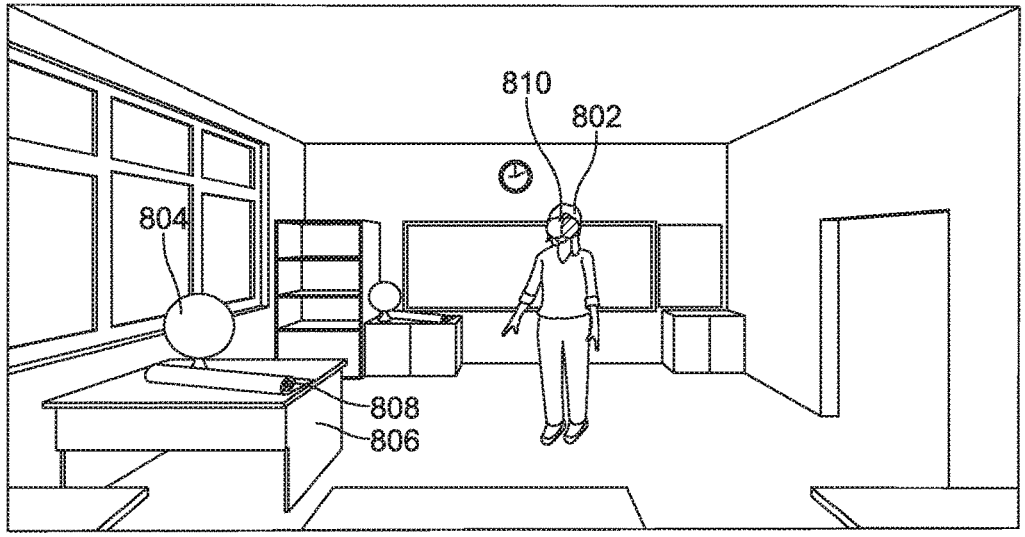
FIG. 8B is a diagram showing a gaze focused on the primary object of the exemplary scene.

FIG. 8B is a diagram showing a gaze 810 focused on the primary object 802 of the exemplary scene. The user may look at a primary object 802, such as the teacher. The teacher may be talking to the user. An updated gaze 810 of the user may be determined (e.g., tracked). Data representing the gaze 810 may be compared to data representing the one or more objects. For example, position data (e.g., direction, path) representing the gaze 810 may be compared to position data (e.g., coordinate) representing at least a portion of the one or more objects. It may be determined, based on the comparison, that the gaze 810 of the user is focused on the primary object 802. For example, the primary object 802 may be directly within a direction (e.g., or path) of the gaze or the primary object 802 may be within a range of a direction of the gaze. An amount of time that the gaze 810 is focused at the primary object 802 may be tracked.

Figure 8C:
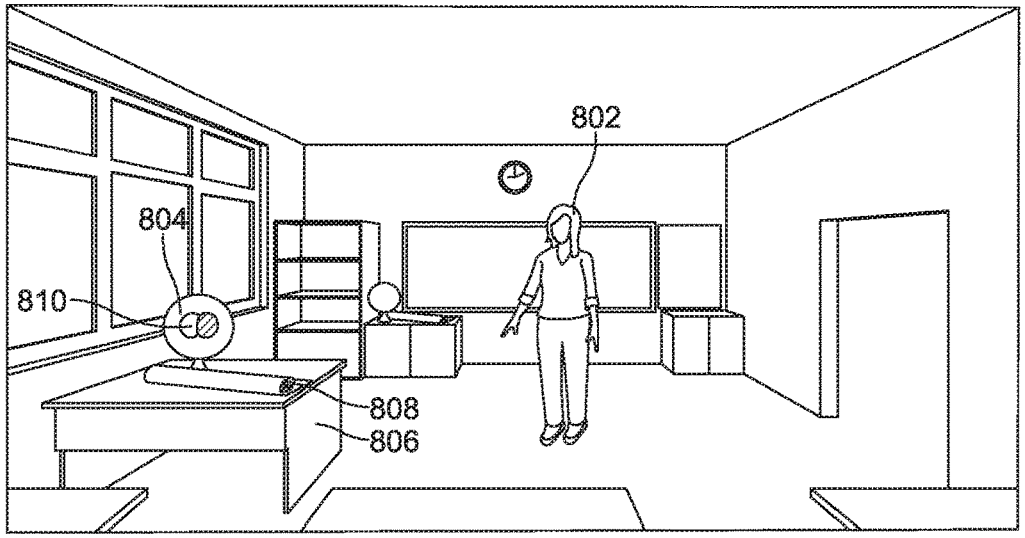
FIG. 8C is a diagram showing a gaze focused on a secondary object of the exemplary scene.

FIG. 8C is a diagram showing a gaze 810 focused on a secondary object of the exemplary scene. The user may look at another object in the scene, such as a globe. An updated gaze 810 of the user may be determined (e.g., tracked). Data representing the gaze 810 may be compared to data representing the one or more objects. For example, position data (e.g., direction, path) representing the gaze 810 may be compared to position data (e.g., coordinate) representing at least a portion of the one or more objects. It may be determined, based on the comparison, that the gaze 810 of the user is focused on a secondary object 804. An amount of time that the gaze 810 is focused on the secondary object 804 may be tracked.

Figure 8D:
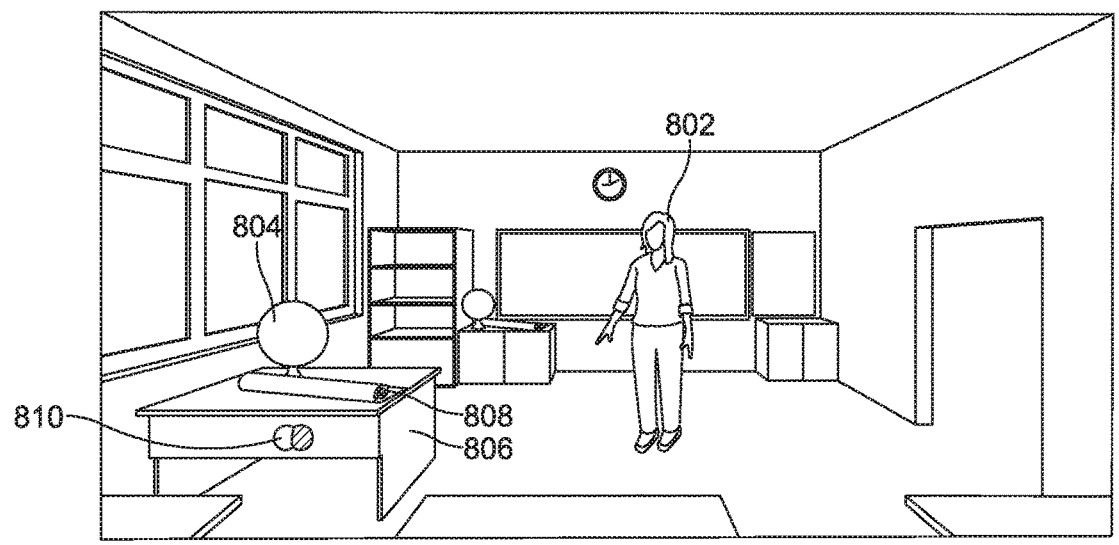
FIG. 8D is a diagram showing a gaze focused on an additional secondary object of the exemplary scene.

FIG. 8D is a diagram showing a gaze 810 focused on an additional secondary object 806 of the exemplary scene. The user may look at an additional secondary object 806 in the scene, such as a desk. An updated gaze 810 of the user may be determined (e.g., tracked). Data representing the gaze 810 may be compared to data representing the one or more objects. For example, position data (e.g., direction, path) representing the gaze 810 may be compared to position data (e.g., coordinate) representing at least a portion of the one or more objects. It may be determined, based on the comparison, that the gaze 810 of the user is focused on the additional secondary object 806 (e.g., the desk). An amount of time that the gaze 810 is focused on the additional secondary object 806 may be tracked.

Figure 8E:
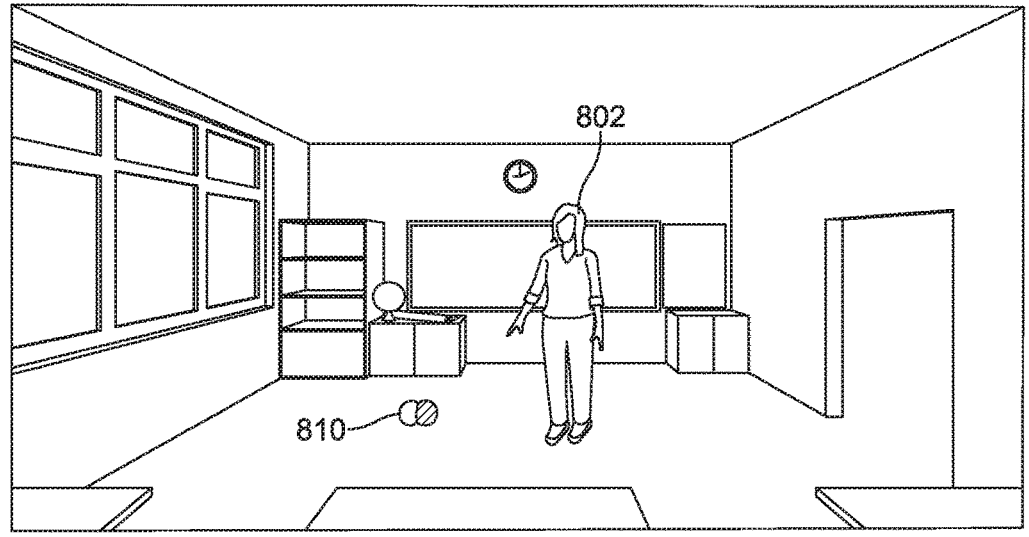
FIG. 8E is a diagram showing removal of secondary objects from the exemplary scene.

FIG. 8E is a diagram showing removal of secondary objects 804, 806, and 808 from the exemplary scene. The amount of time that the gaze 810 is focused on the secondary object 804 and/or the additional secondary object 806, 808 may be compared to a distraction threshold. If the amount of time that the gaze 810 is focused on the secondary object 804 and/or the additional secondary object 806, 808 exceeds the distraction threshold, then it may be determined that the user is distracted.

The secondary object 804 and/or the additional secondary object 806 may be removed from the scene (e.g., based on the comparison to the distraction threshold and/or the determination that the user is distracted). In some scenarios, if the user is distracted, all the secondary objects may be removed or all the secondary objects 804, 806, and 808 within the area of the gaze may be removed. The computer 130 may change an attribute of the secondary object 804 and/or the additional secondary object 806 from visible to invisible. When the attribute has an invisible value, the associated object may not be displayed in the scene. The secondary object 804 and/or the additional secondary object 806 may be removed in other ways. For example, the secondary object 804 and/or the additional secondary object 806 may be removed as one of the objects in the scene. Position information may be stored to allow reinsertion of the objects into the scene.

The gaze of the user may continue to be tracked after the secondary object 804 and/or the additional secondary object 806 are removed from the scene. As shown here, the gaze 810 may be focused near a center of the room, such as on the floor.

Figure 8F:
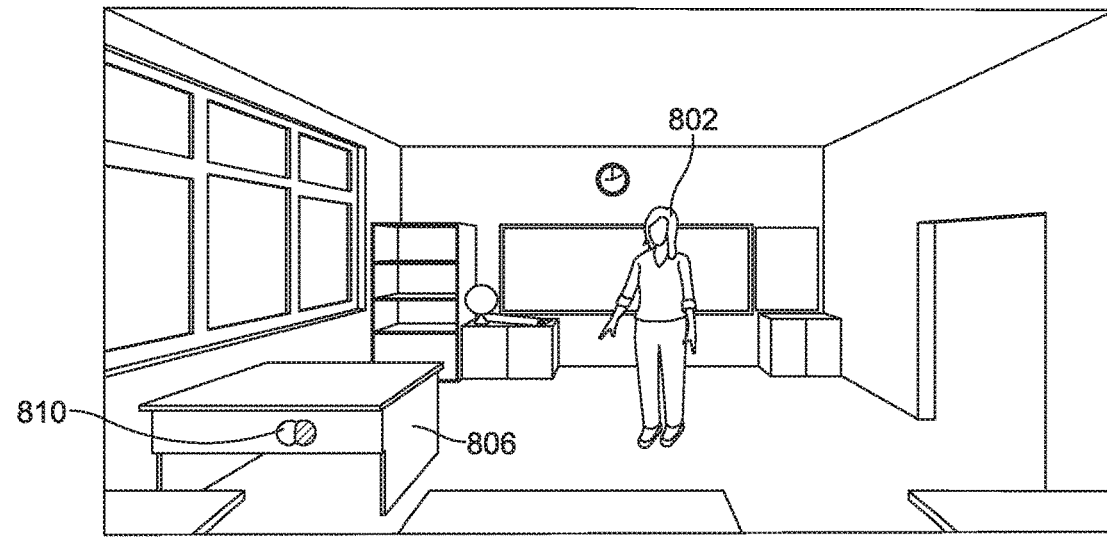
FIG. 8F is a diagram showing reintroduction of the additional secondary object of the exemplary scene.

FIG. 8F is a diagram showing reintroduction of the additional secondary object 806 of the exemplary scene. The additional secondary object 806 (e.g., the desk) is shown again in the scene after previously being removed. The secondary object 804 and/or the additional secondary object 806 may be reintroduced to the scene after a condition is met. The condition may comprise the passing of a predefined amount of time. The condition may comprise the gaze 810 of the user being focused within a threshold range of the primary object 802. The condition may comprise the gaze 810 of the user being focused on the primary object 802 for an amount of time that exceeds a threshold amount of time. The condition may comprise a determination that the user is no longer distracted or is paying attention.

The computer 130 may gradually reintroduce objects that were removed from the scene. The computer 130 may change the attribute associated with a removed object back to visible or insert the objects back into the scene (e.g., add to a collection comprising all the objects in the scene). In this example, the additional secondary object 806 (e.g., the desk), is added back into the scene without adding the secondary object 804 (e.g., the globe). If an additional condition is met, then the remaining secondary objects 804, 808 may be reintroduced into the scene. For example, if the gaze 810 remains focused on the primary object 802, then the secondary object 804 may be added back into the scene. The additional condition may comprise the gaze 810 remaining focused on the primary object 802 for a threshold amount of time, the gaze 810 being focused on the additional secondary object 806 less than a threshold amount of time, and/or the like.

The gaze 810 is shown as focused on the additional secondary object 806. If the user continues to gaze at the additional secondary object 806 for an amount of time that exceeds a threshold (e.g., distraction threshold), then the computer 130 may determine to not add the secondary object 804 (e.g., globe) back into the scene, may determine to remove the additional secondary object 806 again from the scene, and/or the like. If the user stops gazing at the additional secondary object 806 (e.g., or gazes less than a threshold amount), then the secondary object 804 may be added back into the scene.

The embodiments shown and described in this specification are merely examples and not intended to be limiting in any way. Therefore, various changes, modifications, or alterations aspects may be made without departing from the spirit of the invention in the scope of the following claims. All references cited are expressly incorporated by reference herein in their entirety.

What is claimed is:

1. A method comprising:
   outputting, via a display of a headset, a virtual scene to a user, wherein the virtual scene comprises one or more principal objects intended to hold an attention of the user and one or more secondary objects;

capturing, during output of the virtual scene and using an eye-tracking device of the headset, eye tracking data of one or more eyes of the user, further comprising imaging, using a camera of the eye-tracking device, the one or more eyes to determine a gaze direction;

wherein capturing, during output of the virtual scene and using the eye-tracking device of the headset, eye tracking data of one or more eyes of the user comprises capturing one or more Purkinje images of at least one pupil of the one or more eyes of the user;

determining, based on the eye tracking data, gaze information indicative of the gaze direction of the user at a location on the virtual scene;

determining, by correlating the gaze information with position data representing at least one of the one or more secondary objects, that the user is distracted from the one or more principal objects by a first object of the one or more secondary objects; and updating, based on the determination that the user is distracted, the virtual scene to cause the first object to be removed from display while continuing to display a remainder of the virtual scene to the user, wherein the first object is removed from display until a condition is met indicative of the user being attentive to the one or more principal objects.

2. The method of claim 1, wherein determining, based on the gaze information, that the user is distracted by the first object of the one or more secondary objects comprises:

determining, based on the gaze information, that the user is focused on the first object; and comparing an amount of time that the user is focused on the first object to a distraction threshold indicative of the user being distracted.

3. The method of claim 1, further comprising:

determining, based on the gaze information, that the user is distracted from the one or more principal objects by a second object of the one or more secondary objects, wherein updating the virtual scene to cause the first object to be removed from display comprises updating the virtual scene to cause the first object and the second object to be removed from display.

4. The method of claim 3, further comprising updating the virtual scene to reintroduce the first object to be displayed while the second object continues to be removed from display, wherein the second object is caused to be displayed again if the user is determined to give a threshold attention to the principal object.

5. The method of claim 1, wherein determining, based on the gaze information, that the user is distracted from the one or more principal objects by the first object of the one or more secondary objects comprises:

determining a direction of the gaze within the virtual scene; and determining, based on the direction, that the first object is within a path of the gaze.

6. The method of claim 1, wherein determining, based on the gaze information, that the user is distracted from the one or more principal objects by the first object of the one or more secondary objects comprises:

determining that the gaze is outside of a threshold region within the virtual scene where the principal object is located for a threshold amount of time; and determining that the first object is within an area to which the gaze was directed.

7. The method of claim 1, wherein updating the virtual scene comprises changing one or more of a visibility value or opacity associated with the first object or removing or blocking the first object from a collection of objects associated with the virtual scene.

8. The method of claim 6, wherein the threshold amount of time is within a range of 0.1 seconds to 240 seconds.

9. The method of claim 6, wherein the threshold amount of time is determined based on the user.

* * * * *